(12) United States Patent
Kiilunen et al.

(10) Patent No.: US 11,828,342 B2
(45) Date of Patent: Nov. 28, 2023

(54) DEVITRIFIED METALLIC ALLOY COATING FOR ROTORS

(71) Applicant: Lincoln Global, Inc., Santa Fe Springs, CA (US)

(72) Inventors: William D. Kiilunen, Rigby, ID (US); William T. Matthews, Chesterland, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 505 days.

(21) Appl. No.: 17/030,884

(22) Filed: Sep. 24, 2020

(65) Prior Publication Data

US 2022/0090642 A1    Mar. 24, 2022

(51) Int. Cl.
| | | |
|---|---|---|
| *C22C 38/22* | (2006.01) | |
| *F16D 65/12* | (2006.01) | |
| *F16D 65/00* | (2006.01) | |

(52) U.S. Cl.
CPC ....... *F16D 65/127* (2013.01); *F16D 65/0025* (2013.01); *F16D 2200/0013* (2013.01); *F16D 2250/0046* (2013.01); *F16D 2250/0053* (2013.01)

(58) Field of Classification Search
CPC ....... F16D 65/123–128; F16D 65/0025; F16D 2200/0013; F16D 2250/0046; F16D 2250/0053
USPC ........................................................ 148/330
See application file for complete search history.

(56) References Cited

U.S. PATENT DOCUMENTS

| | | |
|---|---|---|
| 6,258,185 B1 | 7/2001 | Branagan et al. |
| 6,689,234 B2 | 2/2004 | Branagan |
| 6,767,419 B1 | 7/2004 | Branagan |
| 7,067,022 B2 | 6/2006 | Branagan |
| 7,186,306 B2 | 3/2007 | Branagan |
| 7,267,844 B2 | 9/2007 | Branagan |
| 7,323,071 B1 * | 1/2008 | Branagan ............ C22C 33/0285 |
| | | 427/456 |
| 7,482,065 B2 | 1/2009 | Branagan |
| 7,553,382 B2 | 6/2009 | Branagan et al. |
| 7,785,428 B2 | 8/2010 | Branagan |
| 7,803,233 B2 | 9/2010 | Gramme et al. |
| 7,935,198 B2 * | 5/2011 | Branagan ................ C22C 38/32 |
| | | 148/330 |
| 8,070,894 B2 | 12/2011 | Branagan |

(Continued)

OTHER PUBLICATIONS

"An Introduction to Thermal Spray", Oerlikon, Jul. 2016, Issue 6 in 24 pages.

(Continued)

*Primary Examiner* — Christopher P Schwartz
(74) *Attorney, Agent, or Firm* — Knobbe and Wolf/Cochran (57) ABSTRACT

The disclosed technology generally relates to coatings, and more particularly to metallic alloy coatings for rotors having nanocrystalline grains. In one aspect, a brake rotor comprises a disc-shaped friction area and a coating having a metallic alloy composition formed on the friction area to form a friction surface configured to contact a brake pad. The metallic alloy composition comprises Fe, Cr, B, C, Mn, Si and Mo as alloying elements that are present at concentrations exceeding impurity concentrations, and wherein the coating comprises nanocrystalline grains having an average grain size less than 100 nm.

26 Claims, 8 Drawing Sheets

(56) References Cited

U.S. PATENT DOCUMENTS

| | | |
|---|---|---|
| 8,097,095 B2 | 1/2012 | Branagan |
| 8,877,296 B2 | 11/2014 | Lembach et al. |
| 2005/0087406 A1 | 4/2005 | Meckel |
| 2011/0068152 A1* | 3/2011 | Cheney .................... C22C 1/00 |
| | | 420/113 |
| 2012/0058363 A1* | 3/2012 | Verpoort .................. C23C 4/08 |
| | | 428/650 |
| 2015/0041262 A1 | 2/2015 | Meckel |
| 2017/0283316 A1* | 10/2017 | Meuler .................... B05D 5/08 |
| 2020/0378459 A1* | 12/2020 | Carminati ................ C23C 4/10 |

OTHER PUBLICATIONS

Aranke et al., "Coatings for Automotive Gray Cast Iron Brake Discs: A Review", Coatings, Aug. 2019, vol. 9-552, DOI: 10.3390/coatings9090552 in 27 pages.

Weartech® SHS™ 7570W, Abrasion & Corrosion Resistance, Wire Arc Spray, The Lincoln Electric Company, www.linconelectric.com, May 2015 in 2 pages.

Weartech® SHS™ 8000W, Severe Abrasion, Wire Arc Spray, The Lincoln Electric Company, www.linconelectric.com, May 2015 in 2 pages.

Weartech® SHS™ 8172W, Severe Abrasion, Wire Arc Spray, The Lincoln Electric Company, www.linconelectric.com, May 2015 in 2 pages.

\* cited by examiner

DEVITRIFIED METALLIC ALLOY COATING FOR ROTORS

BACKGROUND

Field

The disclosed technology generally relates to coatings, and more particularly to metallic alloy coatings for rotors having nanocrystalline grains.

Description of the Related Art

Cast iron is a popular automotive brake disc material in part due to its high melting point, excellent heat storage and damping capability, good castability and machinability, combined with its relatively low cost. However, cast iron has relatively poor corrosion resistance, hardness, wear performance and brake particle emissions. Thus, there is a need for improved rotors having improved corrosion resistance, hardness, wear performance and brake particle emissions.

SUMMARY

In one aspect, a brake rotor comprises a disc-shaped friction area and a coating having a metallic alloy composition formed on the friction area to form a friction surface configured to contact a brake pad. The metallic alloy composition comprises Fe, Cr, B, C, Mn, Si and Mo as alloying elements that are present at concentrations exceeding impurity concentrations, and wherein the coating comprises nanocrystalline grains having an average grain size less than 100 nm.

In another aspect, a brake rotor comprises a disc-shaped friction area and a coating having a metallic alloy composition formed on the friction area to form a friction surface configured to contact a brake pad. The coating comprises a metallic alloy composition comprising Fe, Cr, B, C, Mn, Si and Mo as alloying elements that are present at concentrations exceeding impurity concentrations such that the metallic alloy composition has a glass-to-crystalline transition temperature of 500° C.-750° C.

In another aspect, a method of coating a brake rotor comprises providing a brake rotor having a disc-shaped friction area and forming a coating having a metallic alloy composition comprising Fe, Cr, B, C, Mn, Si and Mo as alloying elements on the disc-shaped friction area to form a friction surface configured to contact a brake pad. Forming the coating comprises forming a molten metallic alloy composition and depositing therefrom the coating under a thermally quenching condition such that, as-deposited, the coating initially comprises a metallic glass.

DETAILED DESCRIPTION

Brake discs, also known as brake rotors, constitute a predominant component of braking systems in today's automotive technologies and are configured to slow down a vehicle by converting kinetic energy into thermal energy, while consequently increasing the temperature of the disc friction surfaces.

Gray cast iron (GCI) is the most commonly used brake disc material due to some of its physical characteristics including high damping capability and desirable thermophysical properties (melting point, thermal conductivity, and heat storage capacity) which can be effective in reducing overheating, brake noise, and brake fade. However, gray case iron also has some notable undesirable characteristics, including poor corrosion resistance that can lead to brake judder, relatively high weight contributing to increased fuel consumption, and relatively high brake wear emissions in the form of brake dust and particulate matter.

Coatings for brake rotors can provide a degree of freedom in improving various performance parameters for brake rotors including cast iron-based brake rotors, such as corrosion resistance, hardness, wear performance and brake particle emissions of existing brake rotors. However, a coating having superior performance with respect to some of the performance parameters may exhibit inferior performance with respect to some other parameters. Some of such tradeoffs can be mitigated by controlling the nanostructure of the metallic alloy, e.g., the degree of crystallization, phases of crystal grains when present and/or the size of the crystalline grains when present. However, many metallic alloy systems offer limited degrees of freedom in engineering the nanostructure, in part because thermodynamically stable phases may be predetermined and controlling kinetics may provide limited degrees of freedom. For example, because of rapid nucleation and/or growth rates of most metallic alloy systems, controlling the grain size to nanoscale may be impractical using conventional quenching techniques.

An amorphous metal (also known as metallic glass or glassy metal) refers to a solid metallic material having an alloy composition which, unlike most metals, have a glass-like structure that lacks long range order. But unlike common glasses, such as window glass, which are typically electrical insulators, amorphous metals are good electrical and thermal conductors. It will be appreciated that most metallic alloy compositions have crystallization rates that are too fast for practically forming metallic glasses from the molten metal composition. However, a combination of specialized composition and rapid cooling techniques can suppress crystallization, such that the material can be at least partly "locked" in a glassy state. The resulting amorphous metals and crystalline-amorphous composites can provide material properties that crystalline materials cannot, for various applications including coating brake rotors.

As described herein, nanocrystalline grains refers grains having an average lateral dimension that may be measureable in a cross-sectional microscope image, e.g., cross-sectional transmission electron microscope image, that is less than 500 nm, less than 250 nm or less than 100 nm. The lateral dimension may be the longest of the lateral dimensions, the shortest of the lateral dimensions, an average or median of the lateral dimensions or a randomly selected one of the lateral dimensions that may be a suitable indication of the grain size and measurable in the cross-sectional microscope image.

As used herein, unless specified otherwise, the term "about" may specify a quantity that can, due to statistical variations such as those in a manufacturing environment, have a variability. The level of the variability can depend on the associated parameter but generally can be within 1-3 times the standard deviation or +/−10% of the nominal or target value.

As described herein, an impurity concentration refers to a weight percentage of an element that is not intentionally introduced but may nevertheless be present, which may generally be less than 0.05%.

In recognition of the challenges associated with the recognized needs for brake rotors, and of technical advantages that can be offered by metallic alloy compositions that can form a metallic glass, the inventors have invented brake rotors according to various embodiments that comprise a disc-shaped friction area having formed thereon a coating having a metallic alloy composition capable of forming a metallic glass, thereby forming a friction surface configured to contact a brake pad. The metallic alloy composition comprises Fe, Cr, B, C, Mn, Si and Mo at concentrations exceeding impurity concentrations and adapted to form a coating comprising an amorphous metallic glass. As-deposited, the coating may have varying volume fractions of metallic glass exceeding, e.g., 10% by volume. Upon devitrification, at least some of the amorphous glass crystallizes to form a coating comprising nanocrystalline grains with superior properties arising in part from the size, structure and chemical composition of the nanocrystalline grains, as described herein.

Figure 1A:
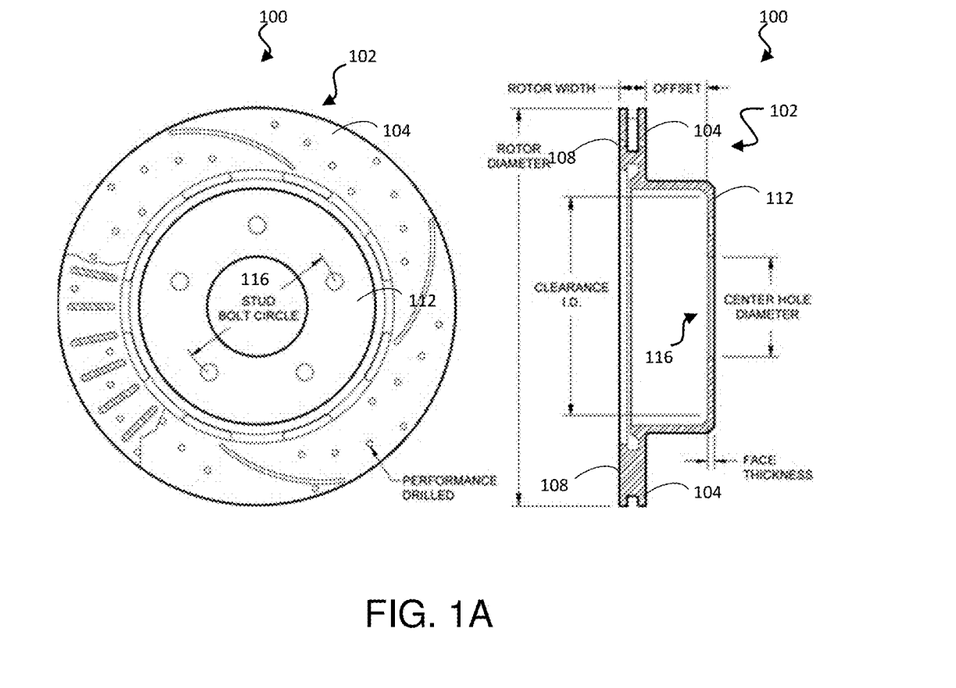
FIG. 1A illustrates a top view and a side view of an example brake rotor on which a coating having a glass-forming metallic alloy composition can be formed according to embodiments.

FIG. 1A illustrates a top-down view (left) and a side view (right) of an example disc brake on which a coating having a glass-forming metallic alloy composition can be formed, according to embodiments. The disc brake 100 comprises a brake disc or rotor 102. The brake rotor 102 comprises an inner surface 108 configured to face the vehicle and an outer surface 104 configured to face away from the vehicle. Each of the inner and outer surfaces 108, 104 has a portion forming a friction area that is configured to overlap a brake pad when viewed in the top-down view. The friction areas of one or both of the inner and outer surfaces 108, 104 have formed thereon a coating having a metallic alloy composition advantageously adapted to form a metallic glass that can be devitrified to form a coating comprising nanocrystalline grains, according to embodiments. Thus coated friction areas of the inner and outer surfaces 108, 104 form a friction surface configured to contact a brake pad to provide the friction force for stopping a vehicle. The disc brake 100 additionally comprises a protruding hub 112 for attaching a wheel thereon. The hub 112 has a center hole 116 for receiving an axle therethrough.

Still referring to FIG. 1A, according to various embodiments, the bulk material of the brake rotor 102 or the disc brake 100 can be formed of cast iron. As described herein, cast iron refers to any alloy in a class of ferrous alloys with carbon contents above about 2.14 wt. %. For example, cast irons contain from about 2.14 wt. % to 4.0 wt. % carbon and anywhere from about 0.5 wt. % to 3 wt. % of silicon. The cast iron according to embodiments can include any of gray cast iron, martensitic white case iron, malleable cast iron and/or ductile cast iron. However, embodiments are not so limited and the coatings according to embodiments can allow a manufacturer to select a bulk material formed of any other suitable material. This is because, while the material of uncoated brake rotors may be selected for their bulk properties, e.g., thermophysical properties (melting point, thermal conductivity, and heat storage capacity), tribological properties and/or mechanical properties, the coating can be selected to complement the bulk material by providing one or more of the desirable properties that the bulk material may not sufficiently provide. That is, the coatings according to embodiments can provide a degree of freedom in selecting the bulk material of the rotor. For example, because cast iron is relatively heavy, coatings according to embodiments described herein can allow various different materials to be employed for as the bulk material. For example, the bulk material of the brake rotor 102 and or the disc brake 100 can be formed of a suitable material, such as steel, layered steel, aluminum, high carbon iron and ceramic, to name a few. A steel rotor that is coated with a coating according to embodiments can advantageously be thinner, weigh less than cast iron and handle heat better. A layered steel rotor formed of layered sheets of steel that is coated with a coating according to embodiments can advantageously provide superior protection against warpage. An aluminum brake rotor that is coated with a coating according to embodiments can advantageously provide superior heat dissipation and light weight. High carbon iron rotor that is coated with a coating according to embodiments can advantageously have superior heat capacity and dissipation. The high carbon iron rotor can also enable the rotor to avoid cracking under high stress, and reduce the brake noise and vibration as well. A ceramic rotor that is coated with a coating according to embodiments can advantageously offer high heat capacity and superior dissipation, and they maintain a more consistent force and pressure as the temperature of the rotors rises. Advantageously, because the coatings according to embodiments described herein can be designed to have a wide range of properties by engineering the nanostructure, they can complement any of these bulk material materials or make up for any deficiencies, thereby providing an overall superior performance compared to an uncoated rotor formed of a bulk material alone.

Figure 1B:
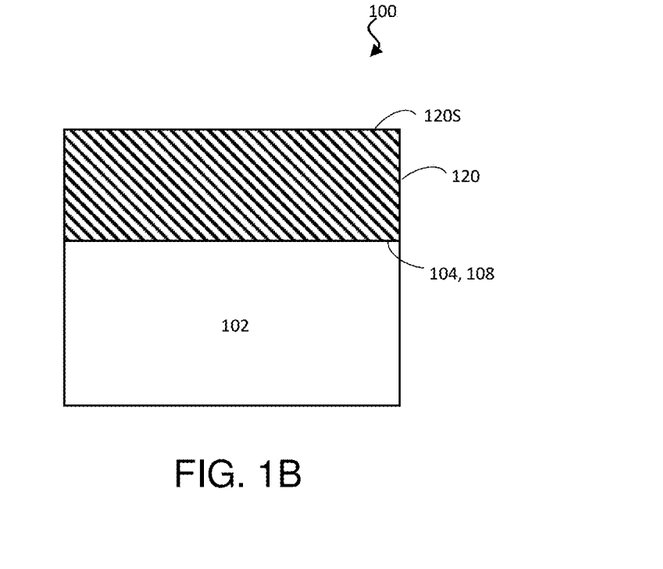
FIG. 1B schematically illustrates a magnified view of the brake rotor of FIG. 1A and the coating having the glass-forming alloy composition formed thereon, according to embodiments.

FIG. 1B schematically illustrates a magnified view of a friction area of the disc brake 100 of FIG. 1A, and a coating 120 having a glass-forming alloy composition formed thereon. Referring to FIG. 1B, according to various embodiments, the friction area of one or both of the inner and outer surfaces 108, 104 has formed thereon a coating 120 having a metallic alloy composition, thereby forming a friction surface 120S configured to contact a brake pad for providing a braking force. According to various embodiments, the metallic alloy composition comprises, on the basis of the total weight of the coating 120, Fe at a weight percentage greater than 20%, 25%, 30%, 35%, 40%, 45%, 50%, 55%, 60%, or a value in a range defined by any of these ranges or values, for instance greater than 28, 54 or 59%. In various embodiments, Cr, B, C, Mn, Si and Mo are present at a combined weight percentage less than 55%, less than 50%, 45%, 40%, 35%, 30%, 25%, or a value in a range defined by any of these ranges or values, for instance less than 36, 45% or 51%, According to various embodiments, the metallic alloy composition comprises, on the basis of the total weight of the coating 120: Cr at a weight percentage greater than an impurity level and less than about 40%, 30%, 25%, 20%, 15%, 10%, or a value in a range defined by any of these ranges or values, for instance less than about 22% or 25%; B at a weight percentage greater than an impurity level and less than about 10%, 7%, 5%, 3%, 1%, or a value in a range defined by any of these ranges or values, for instance less than about 5%; C at a weight percentage greater than an impurity level and less than about 10%, 7%, 5%, 3%, 1% or a value in a range defined by any of these ranges or values, for instance less than about 4% or 2%; Mn at a weight percentage at an impurity level, e.g., less than 1%, or greater than an impurity level and less than about 10%, 7%. 5%, 3%, 2%, 1% or a value in a ranged defined by any of these ranges or values; Si at a weight percentage greater than an impurity level and less than about 10%, 7%, 5%, 3%, 2%, 1% or a value in a range defined by any of these ranges or values; and Mo at a weight percentage greater than an impurity level and less than about 25%, 15%, 10%, 5%, or a value in a range defined by any of these ranges or values, for instance less than about 6%.

According to some embodiments, the metallic alloy composition further comprises, on the basis of the total weight of the coating 120, Nb at a weight percentage greater than an impurity level and less than 15%, 12%, 9%, 6%, 3% or a range or a value in a range defined by any of these ranges or values, for instance less than 5%.

According to some embodiments, the metallic alloy composition further comprises, on the basis of the total weight of the coating 120, W at a weight percentage greater than an impurity level and less than 20%, 15%, 10%, 5% or a range or a value in a range defined by any of these values.

Advantageously, as devitrified coating 120 formed can have porosity less than 5.0%, 4.0%, 3.0%, 2.0%, 1.0%, 0.5%, 0.1% or a value in a range defined by any of these values.

Figure 2:
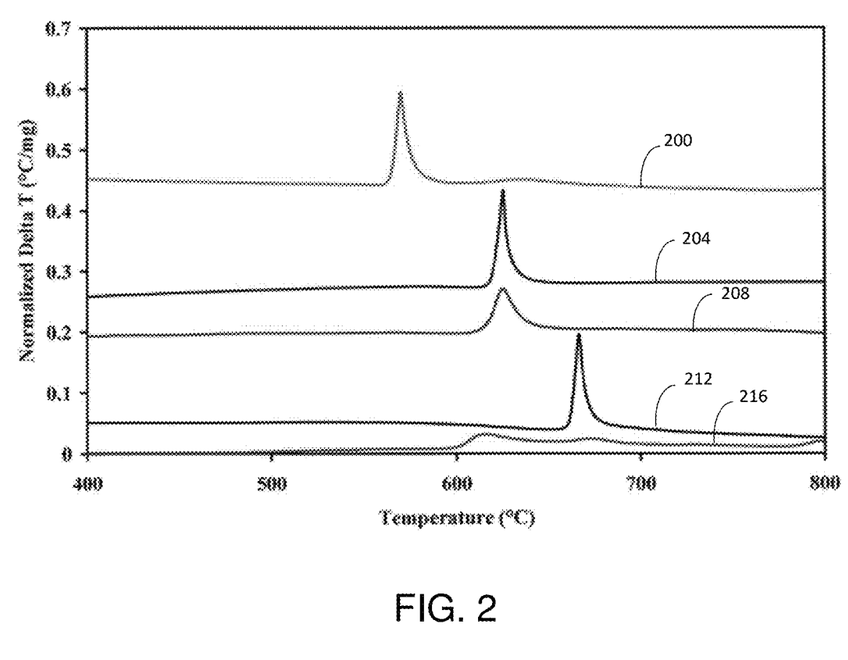
FIG. 2 illustrates experimental differential thermal analysis curves of metallic alloy coatings for brake rotors that are at least partly amorphous as deposited, according to embodiments.

FIG. 2 illustrates experimental differential thermal analysis (DTA) curves corresponding to devitrification processes of some brake disc coatings according to embodiments. The DTA curves correspond to measurements performed on coatings having different example metallic alloy compositions 200, 204, 208, 212 and 216, where each of the coatings are at least partially amorphous as deposited. As illustrated, upon heating, each of the DTA curves is characterized by a devitrification behavior which includes a peak corresponding to a glass-to-crystalline transformation, which is an exothermic transition, at a temperature at which the metallic glass transforms into one or more solid crystalline phases.

Figure 3A:
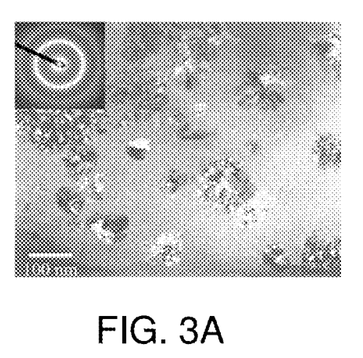
FIG. 3A is a transmission electron micrograph (TEM) of an as-deposited metallic alloy coating for a brake rotor that is at least partly amorphous, according to embodiments.

FIG. 3A is a transmission electron micrograph (TEM) of an as-deposited metallic alloy coating that is at least partly amorphous, according to embodiments. The metallic alloy has a composition corresponding to the DTA curve of the metallic alloy composition 208 shown in FIG. 2. As illustrated, as-deposited, the TEM shows a plurality of nanocrystalline grains that are isolated from each other by an amorphous matrix without substantial impingement, as well as fewer that do impinge each other. The isolated nanocrystalline grains are about 30-150 nm in the shown field. The diffraction pattern illustrated on the top right corner is characterized by diffuse rings, which is characteristic of a composite microstructure that includes amorphous and nanocrystalline phases.

Figure 3B:
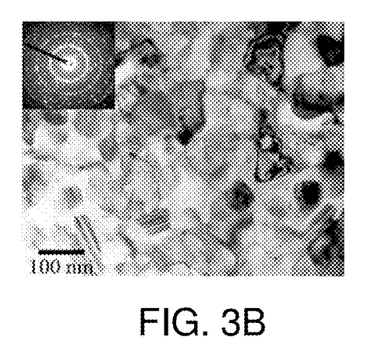
FIG. 3B is a TEM of the metallic alloy coating of FIG. 3A after devitrification, according to embodiments.

FIG. 3B is a TEM of the metallic alloy coating of FIG. 3A after devitrification, according to embodiments. As illustrated, after devitrification at a temperature above the glass-to-crystalline transformation temperature as described above with respect to FIG. 2, the microstructure is characterized by grains that have substantially coarsened relative to those in the TEM shown in FIG. 3A. As illustrated, as-devitrified, the TEM shows a plurality of nanocrystalline grains that are substantially impinging each other, as well as fewer that do not impinge each other. The isolated nanocrystals or nanocrystalline grains are about 30-120 nm. The diffraction pattern illustrated on the top right corner is characterized by sharper rings and spots, which is characteristic of a microstructure that includes predominantly nanocrystalline grains.

Figure 4A:
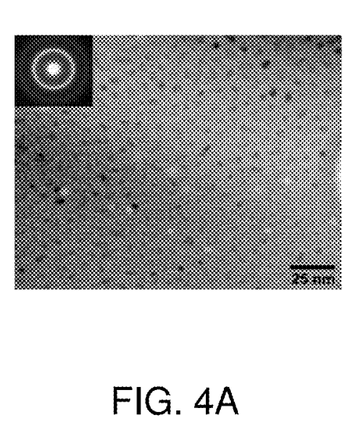
FIG. 4A is a TEM of another as-deposited metallic alloy coating that is at least partly amorphous, according to embodiments.

FIG. 4A is a TEM of an as-deposited metallic alloy coating that is at least partly amorphous, according to embodiments. The metallic alloy has a composition corresponding to the DTA curve of the metallic alloy composition 204 shown in FIG. 2. Similar to FIG. 3A, as-deposited, the TEM shows a plurality of nanocrystals or nanocrystalline grains that are isolated from each other by an amorphous matrix without substantial impingement, as well as fewer that do not impinge each other. The isolated nanocrystals or nanocrystalline grains are substantially smaller at 2-5 nm. The diffraction pattern illustrated on the top right corner is characterized by diffuse rings, which is characteristic of a composite microstructure that includes amorphous and nanocrystalline phases.

Figure 4B:
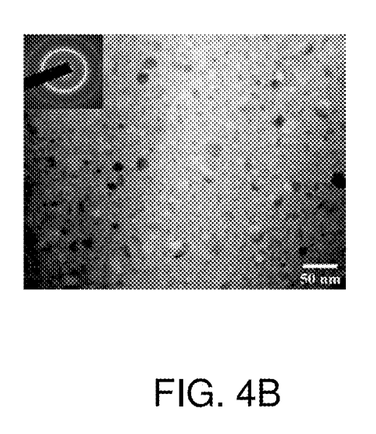
FIG. 4B is a TEM of the metallic alloy coating of FIG. 4A after devitrification, according to embodiments.

FIG. 4B is a TEM of the metallic alloy coating of FIG. 4A after devitrification, according to embodiments. As illustrated, after devitrification at a temperature above the glass-to-crystalline transformation temperature as described above with respect to FIG. 2, the microstructure is characterized by grains that have substantially coarsened relative to those in FIG. 4A. As illustrated, as-devitrified, the micrograph shows a plurality of nanocrystalline grains that are impinging each other, as well as that do not impinge each other. The diffraction pattern illustrated on the top right corner is characterized by sharper rings, which is characteristic of a microstructure that includes predominantly nanocrystalline grains.

Figure 5:
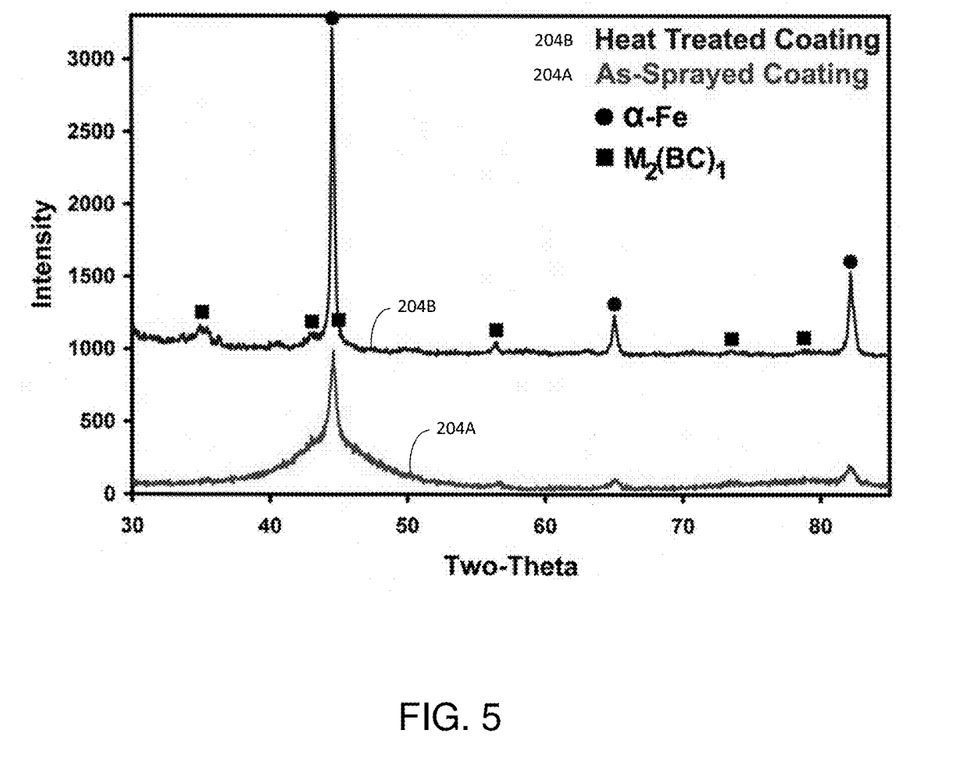
FIG. 5 illustrates X-ray diffraction spectra of as-coated and as-vitrified metallic alloy coating corresponding to TEMs shown in FIGS. 4A and 4B.

The nanostructural and microstructural evolution of the coatings according to embodiments can be further elucidated using X-ray diffraction. FIG. 5 illustrates X-ray diffraction spectra 204A and 204B of as-coated and as-vitrified metallic alloy coatings corresponding to the alloy composition 204 illustrated in the TEMs shown in FIGS. 4A and 4B, respectively. The X-ray spectrum 204A is characterized by a broad amorphous hump, indicating that the as-coated structure is primarily amorphous, but the presence of some Bragg diffraction peaks indicate that some crystalline phases are present. After devitrification at 800° C. for 2 hours, the X-ray spectrum 204B indicates that the coating has substantially devitrified, with the X-ray spectrum 204B characterized by multiple sharp peaks. Two phases were identified to be present, including ferrite (α-Fe) and a mixed transition metal borocarbide phase with an $M_2(BC)_1$ stoichiometry, where M is one of the metal elements present in the alloy composition. The inventors have discovered that the presence of these nanocrystalline grains is correlated with a transformation of the coating into a much harder and more wear-resistant coating.

It will be appreciated that, while FIGS. 3A-4B and 4A-4B show exemplary snapshots of as-coated and as-devitrified coatings, embodiments are not so limited. By controlling the deposition (e.g., spray coating) and devitrification conditions, both the as-coated and as-devitrified coatings can be tailored to have a suitable amount of crystalline volume fraction for the application.

According to various embodiments, as-deposited, e.g., the coating 120 (FIG. 1B) can have, on the basis of the total volume of the coating 120, an amorphous volume fraction of 20-30%, 30-40%, 40-50%, 50-60%, 60-70%, 70-80%, 80-90%, 90-99% or a volume fraction in a range defined by any of these values, on the basis of the total volume of the coating 120. When present, the nanocrystalline grains in the as-deposited can have an average of the longest lateral dimension, when measured in a transmission electron micrograph, that can be 2-5 nm, 5-10 nm, 10-20 nm, 20-50 nm, 50-100 nm, 100-150 nm, 150-200 nm, or a value in a range defined by any of these values.

According to various embodiments, as-vitrified, e.g., as present on the final brake rotor that is ready to use, the devitrified coating 120 (FIG. 1B) can have, on the basis of the total volume of the coating 120, an amorphous volume fraction that is smaller than that of the as-deposited coating 120, which can be 0-10%, 10-20%, 20-30%, 30-40%, 40-50%, 50-60%, 60-70%, 70-80% or a volume fraction in a range defined by any of these values. In both the as-coated and as-devitrified coating 120, the volume fraction that is not occupied by a glass phase can be occupied by nanocrystalline grains. The nanocrystalline grains can have an average of the longest lateral dimensions, when measured in a TEM, that is greater than that in the as-coated coating by a factor greater than 150%, 200%, 400%, 600%, 800%, 1000% or a value or a range defined by any of these values, which can be, for example, be 3-10 nm, 10-20 nm, 20-50 nm, 50-100 nm, 100-150 nm, 150-200 nm, 200-300 nm, 300-400 nm, 400-500 nm, or a value in a range defined by any of these values.

Advantageously according to various embodiments, the metallic alloy compositions capable of forming a metallic glass comprises Fe, Cr, B, C, Mn, Si and Mo at concentrations such the metallic alloy composition has a glass-to-crystalline transition temperature of about 450-800° C., 450-500° C., 500-550° C., 550-600° C., 600-650° C., 650-700 ° C., 700-750° C., 750-800° C., or a temperature in a range defined by any of these values, for instance 500-750° C. Advantageously for brake rotor applications, the metallic alloy compositions according to embodiments can be engineered to have a glass-to-crystalline transition temperature that is substantially above typical peak temperatures the brake rotors may be subjected to in use, which can typically be about 200° C., but can reach as high as 550° C. The glass-to-crystalline transition temperature that is substantially above the peak operational temperatures can advantageously preserve the structural features of the nanostructure, e.g., grain size, phases present or crystalline volume fraction, to remain relatively unchanged from those in as-manufactured coated brake discs, such that the various performance parameters remain unchanged throughout use.

The metallic alloy compositions according to embodiments have a melting temperature ($T_m$) of about 1000-1400° C., 1000-1050° C., 1050-1100° C., 1100-1150° C., 1150-1200° C., 1200-1250° C., 1250-1300° C., 1300-1350° C., 1350-1400° C., or a temperature in a range defined by any of these values, for instance 1100-1250° C. A metallic alloy composition having a melting temperature having such a value may be advantageous in reducing what is known as brake fading, which refers to a reduction in stopping power after repeated or sustained application of the brake. The inventors have discovered that that brake fading can be significantly reduced when the $T_m$ is substantially greater than the peak operational temperature, such that a ratio of the $T_m$ to the peak operational temperature is greater than 1.3, 2.0, 3.0, 4.0, 5.0, 6.0, 7.0, or a value in range defined by any of these values, for instance 1.4.

The metallic alloy composition has a composition such that the glass devitrification occurs at a relatively low fraction of the melting temperature in ° C., e.g., 0.3 $T_m$, 0.4 $T_m$, 0.5 $T_m$, 0.6 $T_m$, 0.7 $T_m$, or a value in a range defined by any of these values, where diffusion is limited and where the driving force, due to the metastable nature of the glass state, is very high. Such characteristic advantageously leads, during devitrification, to very high and sharp nucleation rate which occurs within a limited time, before the grains start to impinge between neighboring grains, thereby resulting in the formation of nanocrystalline grains having a relatively narrow size distribution.

Figure 6:
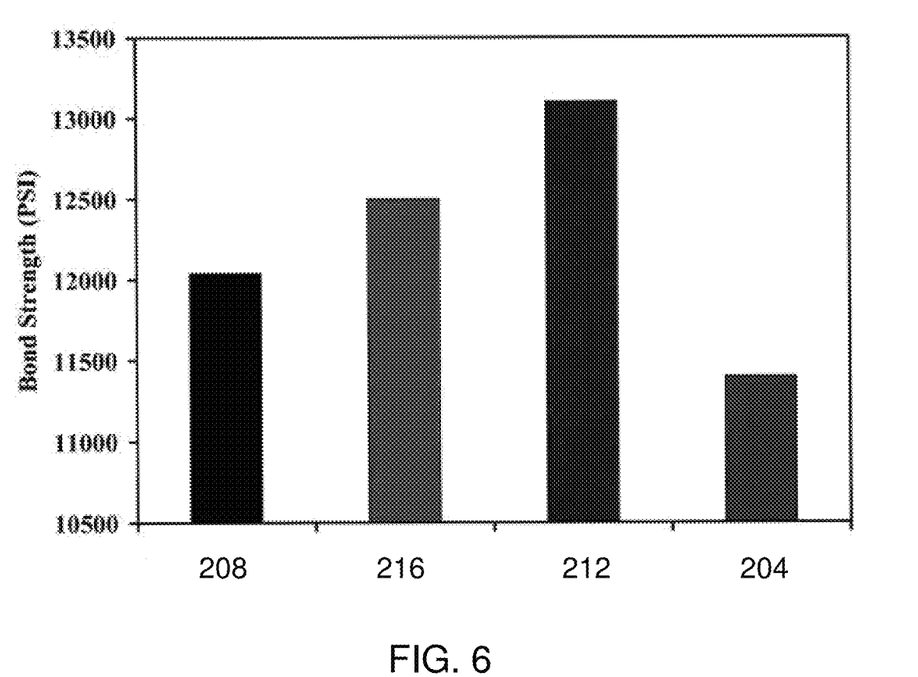
FIG. 6 illustrates experimentally measured bond strengths of as-devitrified metallic alloy coatings formed according to embodiments.

The coatings having metallic alloy compositions according to embodiments can have various advantageous effects in the particular context of brake rotor coatings, as described herein. The rotor coatings disclosed herein advantageously exhibit very high bond strength (e.g., greater than 40 MPa) to the underlying substrate without using an underlying bond coat, thereby enabling direct formation of the rotor coatings on the bulk rotor substrate. Without being bound to any theory, one reason for this exceptional level of bonding can be related to the as-deposited coating starting from a highly active liquid melt. While solubilities of alloying elements may be limited in conventional forms of iron (e.g., BCC ferrite/FCC austenite), the metallic glasses according to embodiments have almost universal solubility of a wide range of elements. Due to the glass forming nature, much higher solubilities of alloying elements can be obtained, allowing over 25 wt. % of transition metal to be dissolved in the liquid and be retained in the as-deposited glass structure. This results in, among other effects, the highly active liquid melts containing a high fraction of deoxidizing (e.g., oxygen seeking) transition metal elements which serve to reduce the native oxide on the substrate almost instantaneously upon contact. This scrubbing effect of the substrate surface allows the coating to form a partial metallurgical bond to the base metal in addition to the normal physical bond resulting from the surface profile. This can, among other effects, allow the achievement of bond strengths which are much higher than conventional wire-arc coatings. The coatings according to embodiments disclosed herein can have bond strengths of, based on ASTM C633-01 standard, 35-40 MPa, 40-45 MPa, 45-50 MPa, 50-55 MPa, 55-60 MPa, 60-65 MPa, or a value in a range defined by any of these values, or based on ASTM C611 standard, 9,000-9,500 psi, 9,500-10,000 psi, 10,000-10,500 psi, 10,500-11,000 psi, 11,000-11,500 psi, 11,500-12,000 psi, 12,000-12,500 psi, 12,500-13,000 psi, 13,000-13,500 psi, or a value in a range defined by any of these values. Experimental measurements of bond strengths of as-vitrified alloy compositions are illustrated in FIG. 6.

Figure 7:
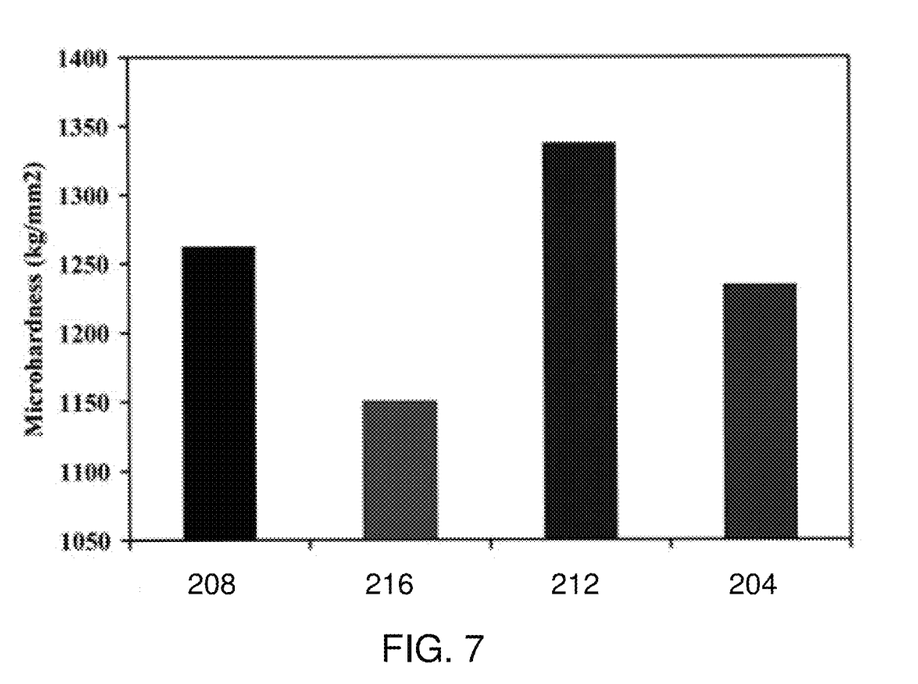
FIG. 7 illustrates experimentally measured microhardness of as-devitrified metallic alloy coatings formed according to embodiments.
Figure 8:
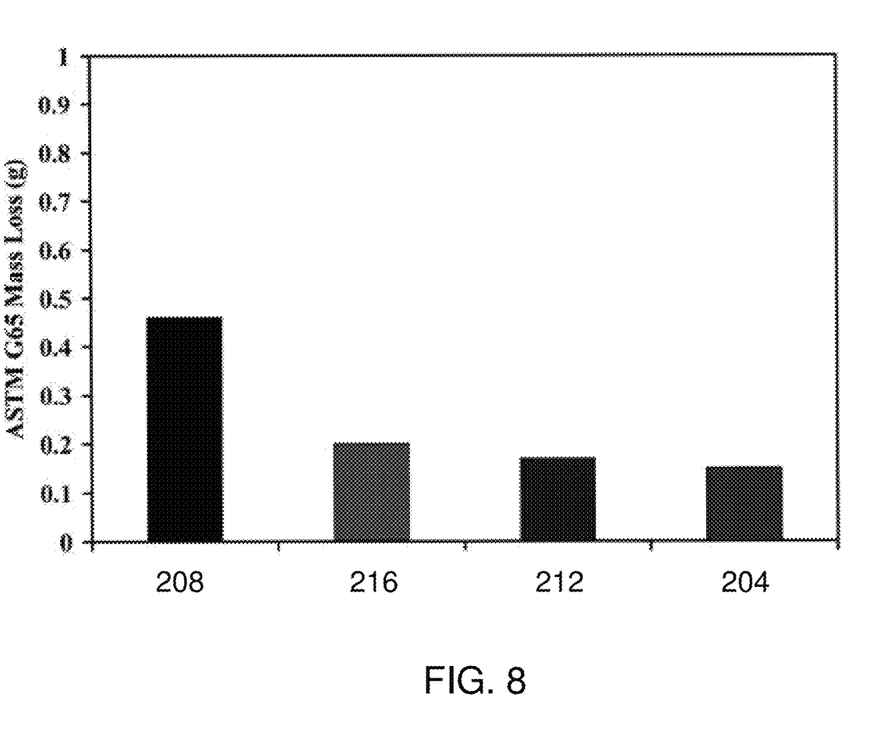
FIG. 8 illustrates experimentally measured wear resistance of as-devitrified metallic alloy coatings formed according to embodiments.

The rotor coatings disclosed herein advantageously exhibit excellent hardness, owing to very low density of two- and three-dimensional defects such as dislocations, inherently due to the predominantly amorphous and nanocrystalline nanostructure of the coatings described herein. Because the coating technology disclosed herein is based on metallic glasses, which inherently does not have certain classes of defects such dislocations, even after devitrification, grain/phase boundaries can have much higher strengths, typically around at least 30 to 35% of theoretical strengths. Without being bound to any theory, theoretical strengths may not be achieved because, while essentially free of certain two- and three-dimensional defects, the metallic glass structure still has free volume defects (e.g., point defects such as vacancies). After devitrification, the metallic glass structure is transformed into one containing a high volume fraction of grain/phase boundaries which can occupy up to 10 volume % of the resulting structure. This resulting nanoscale grain structure is found to have typical strength and hardness values that are at least 35-50% of theoretical values. As devitrified, the coatings according to embodiments disclosed herein can have microhardness values of, based on Vickers hardness HV0.30, 900-950 kg/mm$^2$, 950-1000 kg/mm$^2$, 1000-1050 kg/mm$^2$, 1050-1100 kg/mm$^2$, 1100-1150 kg/mm$^2$, 1150-1200 kg/mm$^2$, 1200-1250 kg/mm$^2$, 1250-1300 kg/mm$^2$, 1300-1350 kg/mm$^2$, or a value in a range defined by any of these values. Experimental measurements of microhardness of as-vitrified alloy compositions are illustrated in FIG. 7.

The rotor coatings disclosed herein exhibit excellent wear and erosion resistance, owing to the nanoscale grains and/or amorphous matrix, which can be resistant to grain pull-out. As devitrified, the coatings according to embodiments disclosed herein can have abrasion resistance measured as mass loss, based on ASTM G-65 Procedure B testing method, that is less than 0.5 g, 0.4 g, 0.3 g, 0.2 g, 0.1 g, or a value in a range defined by any of these values. The excellent wear resistance may be attributable to high nucleation rate that gives rise to relatively uniform nanocrystalline grains, as described above. The nanocrystalline grains give rise to various technical advantages including, e.g., abrasion resistance arising from exceptionally smooth surfaces that remain smooth even as the coating wears out. This may be because, without being bound to any theory, the nanocrystalline grains that are at least partly embedded in an amorphous matrix may suffer much less from grain pull-out during use. In addition, even when the grains to pull out, because of the small size, the overall erosion may be less than in conventional crystalline materials.

EXAMPLE METALLIC ALLOY COMPOSITIONS

In the following, experimental metallic alloy compositions and experimentally measured performance parameters are provided as examples. In the following, the disclosed performance values as disclosed may represent an average or typical value. However, it will be understood that the performance values are not so limited, and the experimental samples may have performance values representing up to about 20% better (higher or lower depending on the parameter) than the disclosed values herein.

Example 1

| Material Chemistry (wt. %): | |
| --- | --- |
| Chromium | <22% |
| Boron | <5% |
| Molybdenum | <5% |
| Niobium | <5% |
| Carbon | <2% |
| Manganese | <1% |
| Silicon | <1% |
| Iron | Balance |

Microhardness (HV0.3): 1000-1200 typical

| Microhardness (Average) at Elevated Temperatures: |
| --- |
| 1030 kg/mm$^2$ at 70° F. |
| 912 kg/mm$^2$ at 300° F. |
| 620 kg/mm$^2$ at 600° F. |
| 309 kg/mm$^2$ at 1200° F. |
| 117 kg/mm$^2$ at 1400° F. |

Wear Resistance (ASTM G65-04 Procedure B, after 2,000 cycles, typical mass loss): 0.18 g
Bond Strength (ASTM C633-01): 8 ksi (55 MPa) typical

| Coating Properties: | |
| --- | --- |
| Density (g/cm$^3$): | 7.30 |
| Porosity/Oxides: | <5% |
| Coefficient of Friction: | 0.316 |
| Thermal Expansion Slope: | 8.53 at temperatures of 100-500° C. |

| Thermal Conductivity: | |
| --- | --- |
| Temperature | (W/mK) |
| 23° C. | 4.280 |
| 50° C. | 4.678 |
| 75° C. | 5.055 |
| 100° C. | 5.269 |
| 125° C. | 5.505 |
| 150° C. | 5.707 |

Impact Resistance (Drop Impact Testing): No delamination/cracking at 480 in-lbs.

The coatings according to Example 1 correspond to the metallic alloy composition 204 (FIG. 2) and exhibit a combination of high wear resistance, elevated temperature erosion resistance and a unique high hardness/toughness combination.

These coatings also exhibit excellent combinations of corrosion and wear resistance, superior bond strength and high impact resistance. Superior bond strength values signify that this material has exceptional adhesion and cohesion. This also highlights the material's low residual stress (even at high thicknesses) characteristic of this coating type. The probability of "pull-out" of individual particles during wear, erosion and other service conditions is extremely low. Low coating permeability results in a highly corrosion resistant barrier. Low oxide content contributes to high bond strength due to the very limited presence of internal voids and other defects. These characteristics provide predictable coating performance across a broad variety of service environments. Example 1 is especially resistant to elevated temperature oxidation, erosion and corrosion for protecting brake rotor surfaces.

Impact testing on the coatings according to Example 1 was performed using a Gardner Impact testing machine with a 12 lb. test weight and 0.5 in. diameter impact punch dropped from 40 in height. As-sprayed and heat-treated (one hour soak at 600° C., water quenched) coatings of 0.020 in. thickness were tested. The as-sprayed and heat-treated coatings survived 480 in-lbs. impact and demonstrated the ability to deform with the substrate without chipping, cracking or delaminating.

When the coatings according to Example 1 is sprayed directly onto substrate alloys of the rotor using, e.g., a twin wire thermal spray process described below using standard substrate preparation practices and without a bond coat, extremely high bond strength is achieved. In ASTM C633-01 Adhesion/Cohesion Bond Strength Tests, extremely high bond strength is achieved for Example 1 coatings on plain carbon steel, far exceeding bond strength of conventional coating materials.

Example 2

| Material Chemistry (wt. %): | |
| --- | --- |
| Chromium | <25% |
| Tungsten | <15% |
| Niobium | <12% |
| Molybdenum | <6% |
| Boron | <5% |
| Carbon | <4% |
| Manganese | <3% |
| Silicon | <2% |
| Iron | Balance |

Microhardness (HV0 .3): 975-1025 kg/mm$^2$
Wear Resistance (ASTM G65-04 Procedure B, typical mass loss): 0.17 g
Bond Strength (ASTM C633-01): 6 ksi (41 MPa)

| Coating Properties: | |
| --- | --- |
| Density (g/cm$^3$): | 7.68 |
| Porosity/Oxides: | <5% |

Impact Resistance (Drop Impact Testing): No delamination/cracking at 480 in-lbs.
Maximum Operating Temp: 800-900° C.

The coatings according to Example 2 correspond to the metallic alloy composition 212 (FIG. 2) and exhibit a combination of exceptional wear, corrosion and high temperature oxidation resistance in severe abrasion and fine particle erosion environments.

These coatings excel in extreme environments where severe abrasion is encountered, particularly when wear is combined with corrosion or high temperature oxidation. Example 2 also features superior bond strength and toughness. Superior bond strength values of this coating signify that this material has exceptional adhesion and cohesion. High adhesion values highlight the low residual stress (even at high thicknesses) that is characteristic of coatings of this type. High cohesion values mean that the probability of "pull-out" of individual particles is extremely low during wear, erosion and other service conditions. Low porosity provides low coating permeability, resulting in a highly corrosion resistant barrier. Low oxide content is another key ingredient contributing to the high bond and inter lamellar strength of this coating due to the low incidence of internal voids and other defects. These characteristics provide predictable coating performance across a variety of service environments. Example 2 has been developed to produce deposits that have extreme resistance to abrasion and a significant ability to withstand corrosion and high temperature oxidation. Example 2 represents a breakthrough in the development of arc spray wires with exceptional hardness and wear resistance which form an amorphous/nanoscale structure during solidification without needing to fill the core with ceramics or hard metals. The extremely fine microstructure improves toughness and provides exceptional wear resistance in applications involving fine particle abrasion and erosion.

The coatings according to Example 2 is a glass forming steel alloy formulated with high concentrations of transition metals which readily dissolve in the glass structure. When sprayed using benchmark parameters, an amorphous matrix which contains hard complex nanoscale borocarbide precipitates forms. After complete devitrification, a unique ductile matrix is formed, including α-Fe and α-Fe phases with high volume fractions of extremely hard complex $M_2(BC)_1$ borocarbide phases. When compared to existing competing arc spray wires, the nanostructure of the coatings according to Example 2 formed in as-sprayed or fully devitrified states provide superior resistance to abrasive wear and fine particle erosion.

The coatings according to Example 2 coatings feature superior toughness and resiliency. Impact testing on the coatings were performed using a Gardner Impact testing machine. As-sprayed Example 2 coatings withstood impacts of 120, 240, 360 and 480 in-lbs. without cracking, chipping or delaminating, while demonstrating the ability to deform with the substrate.

Example 3

| Material Chemistry (wt. %): | |
| --- | --- |
| Chromium | <25% |
| Molybdenum | <15% |
| Boron | <5% |
| Tungsten | <5% |
| Carbon | <2% |
| Manganese | <2% |
| Silicon | <2% |
| Iron | Balance |

Microhardness (HVO .3): 950-1150 kg/mm$^2$
Wear Resistance (ASTM G65-04 Procedure B, typical mass loss): 0.20 g
Bond Strength (ASTM C633-01): 8 ksi (55 MPa) typical

| Coating Properties: | |
| --- | --- |
| Density (g/cm$^3$): | 7.59 |
| Porosity/Oxides: | <5% |

Impact Resistance (Drop Impact Testing): No delamination/cracking at 480 in-lbs.

The coatings according to Example 3 correspond to the metallic alloy composition 216 (FIG. 2) and exhibit exceptional combination of wear, impact and corrosion resistance in high chlorine, salt fog, and salt-containing environments.

These coatings exhibit excellent corrosion resistance, high wear resistance, high impact resistance and superior bond strength. Superior bond strength values of these coatings signify that this material has exceptional adhesion and cohesion. High adhesion values highlight the low residual stress (even at high thicknesses) that is characteristic of coatings of this type. High cohesion values mean that the probability of "pull-out" of individual particles is extremely low during wear, erosion and other service conditions. Low porosity means low coating permeability, resulting in a highly corrosion resistant barrier. Low oxide content is another key ingredient contributing to the high bond strength of these coatings due to the very limited presence of internal voids and other defects. These characteristics provide predictable coating performance across a broad variety of service environments. Coatings according to Example 3 develop extreme passive film stability at a range of pH in both oxidizing and reducing environments, and are especially resistant to corrosion in high chlorine and seawater environments, making it a viable alternative that offers significantly better wear performance than nickel superalloys and stainless steels.

The coatings according to Example 3 form a nearly perfect metallic glass coating. In the X-ray diffraction diagram to the right, the broad amorphous hump and almost complete lack of Bragg diffraction peaks indicates that the as-sprayed coating structure is primarily a metallic glass, representing the ultimate in uniformity. This extreme, almost atomic-level homogeneity makes it very difficult for the electrochemical system to set up specific sites for anodic attack. Simultaneously, the chemistry has been optimized so that an extremely stable passive protective oxide layer forms in a wide range of both oxidizing and reducing environments. The combined approach of optimizing the passive film stability and the extreme refinement of the coating microstructure results in high corrosion resistance in a variety of environments, including seawater.

The coatings according to Example 3 exhibit excellent corrosion resistance in seawater solutions and salt fog environments. These coatings are also hard (HV300 950-1150 kg/mm$^2$ HVO 0.3) and wear resistant, with properties superior to other high corrosion materials such as nickel superalloys and stainless steels. This allows the coatings to exhibit damage tolerance in a wide variety of conditions. Since the majority of material failures occur at the surface from damage due to wear/abrasion, corrosive attack or the creation of defects leading to fatigue crack initiation, applying these coatings to the surfaces of brake rotors can vastly extend service lifetime and reduce total ownership costs.

Figure 9:
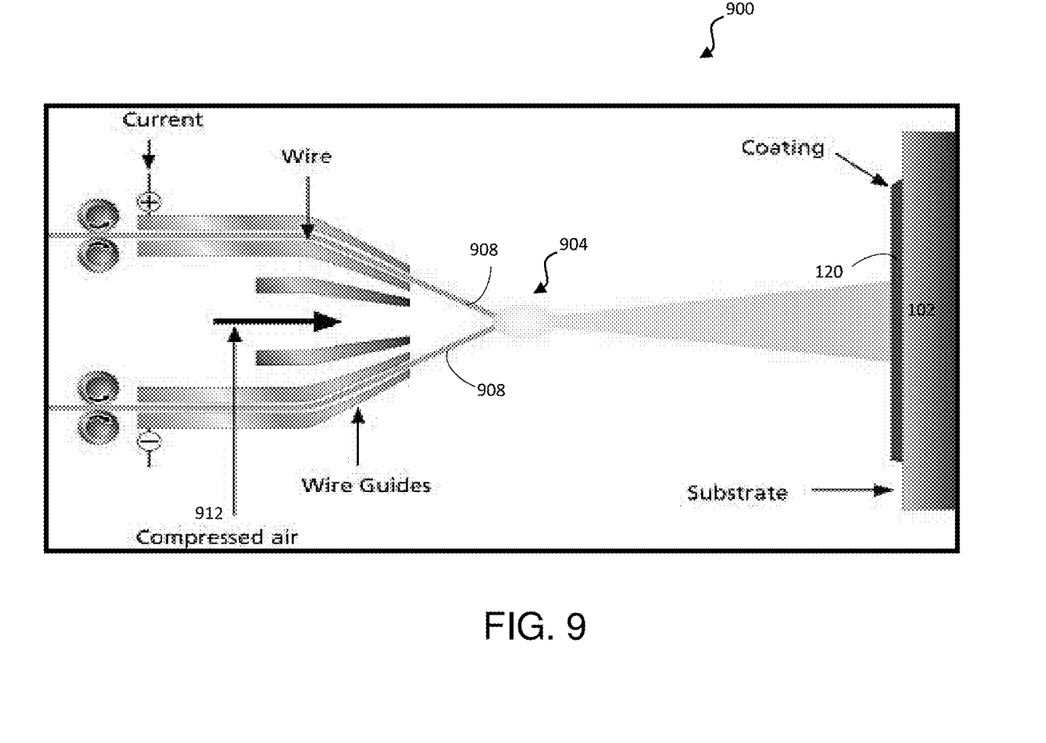
FIG. 9 illustrates a method of coating a brake rotor using an electric arc thermal spray process, according to embodiments.
Figure 10:
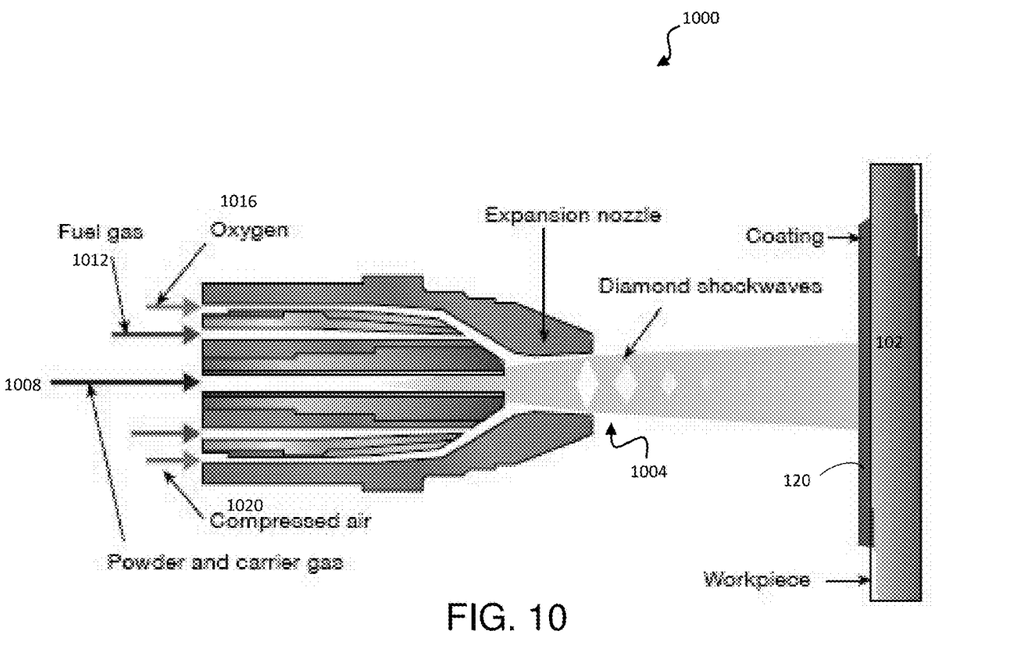
FIG. 10 illustrates a method of coating a brake rotor using a high velocity oxygen fuel thermal spray process, according to embodiments.

As described above, various advantages of the coatings according to various embodiments derive from their capability to form an as-deposited coating that is at least partly amorphous, such that a subsequent devitrification process can be tailored for specific applications. In the following, methods of coating that allows for a partly amorphous as-deposited coating are described. FIGS. 9 and 10 discloses methods 900 and 1000, respectively, of coating a brake rotor according to embodiments. According to various embodiments, the methods 900 and 1000 comprise providing a brake rotor 102 having a disc-shaped friction area, as described above with respect to FIGS. 1A and 1B. The methods 900 and 1000 additionally comprise forming a coating 120 having a metallic alloy composition comprising Fe, Cr, B, C, Mn, Si and Mo on the disc-shaped area to form a friction surface configured to contact a brake pad. According to embodiments, forming the coating 120 comprises forming a molten metallic alloy composition and depositing therefrom the coating 120 under a thermally quenching condition such that, as-deposited, the coating initially comprises a metallic glass.

According to embodiments, forming the molten metallic alloy composition and depositing therefrom the coating 120 comprises thermal spraying. As described herein, thermal spraying refers to spray-coating processes in which a molten (or heated) base material is propelled at high speed onto a prepared component surface, where it solidifies and forms a solid layer. The coating precursor is heated by electrical (e.g., plasma or arc) or chemical means (e.g., combustion flame). The liquid or molten coating particles impact the surface at high speed, which causes the particles to deform and spread like "pancakes" on the substrate. In this process, heat from the hot particles is transferred to the cooler base material. Unlike conventional coating materials, the particles of metallic alloy compositions according to embodiments have sufficiently slow crystallization rate such that the heat transfer quenches the molten particles at least partially in their amorphous state, thereby forming an as-deposited coating 120 that comprises a metallic glass. As the particles shrink and solidify, they bond to the roughened base material. Adhesion of the coating can be based on mechanical "hooking." The coatings according to embodiments can be formed using a variety of thermal spray processes, including combustion wire spray, combustion powder spray, electric wire spray, plasma spray and high velocity oxy-fuel spray (HVOF), to name a few examples. By way of illustration, FIGS. 9 and 10 illustrate an electric wire spray process 900 and a HVOF process 1000, respectively.

Referring to FIG. 9, in an electric arc process 900, e.g., a twin wire arc spray process, an arc 904 is formed by two oppositely charged wires 908 making contact with each other. The wires 908 can have the same or different compositions. The arc 904 causes melting at the tip of the wires 908. Compressed air 912 atomizes the melted spray material and accelerates onto the substrate such as the brake rotor 102. The rate of spray is adjusted by appropriate regulation of the wire feed as it is melted, so a constant arc can be maintained.

Referring to FIG. 10, a high velocity oxy-fuel spray (HVOF) process 1000 uses a supersonic jet, such that the speed of particle impact on the substrate is much higher compared to conventional flame spray, resulting in improved coating characteristics. A spray material comprising a powder 1008 is melted in a jet caused by a mixture of a fuel gas 1012 and oxygen 1016. The fuel gas 1012 can be propylene, acetylene, hydrogen and/or natural gas. The powder 1008 can be fed into the jet 1004 where it is melted and atomized by the addition of compressed air 1020 that also directs the melted material towards the substrate such as the brake rotor 102. The mechanism differs from conventional flame spraying by an expansion of the jet 1004 at the exit of the gun.

After forming the coating 120 initially comprising the metallic glass, coating methods according to embodiments additionally comprise annealing the as-deposited coating 120 to devitrify the metallic glass at temperatures exceeding amorphous-to-crystalline transition temperatures disclosed above to form the coating 120 comprising nanocrystalline grains having an average grain size less than 100 nm. Thus formed coating 120 can have various structures and advantages described above.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A brake rotor, comprising:
a disc-shaped friction area; and
a coating having a metallic alloy composition formed on the friction area to form a friction surface configured to contact a brake pad,
wherein the metallic alloy composition comprises Fe, Cr, B, C, Mn, Si and Mo as alloying elements that are present at concentrations exceeding impurity concentrations, wherein the coating has less than 5% porosity, and wherein the coating comprises nanocrystalline grains having an average grain size less than 100 nm.

2. The brake rotor of claim 1, wherein the coating comprises a composite structure comprising the nanocrystalline grains and a metallic glass phase.

3. The brake rotor of claim 2, wherein the metallic glass has dissolved therein at least 25% of the alloying elements.

4. The brake rotor of claim 1, wherein the metallic alloy composition has a glass-to-crystalline transition temperature of 500-750° C.

5. The brake rotor of claim 4, wherein the metallic alloy composition comprises, on the basis a total weight of the coating:
Fe at a weight percentage exceeding 25%; and
Cr, B, C, Mn, Si and Mo at a combined weight percentage less than 55%.

6. The brake rotor of claim 5, wherein the metallic alloy composition further comprises Nb at a concentration exceeding an impurity level.

7. The brake rotor of claim 5, wherein the metallic alloy composition further comprises W at a concentration exceeding an impurity level.

8. The brake rotor of claim 1, wherein the nanocrystalline grains comprise a ferrite and a borocarbide.

9. The brake rotor of claim 1, wherein a bulk material of the disc-shaped friction area is formed of a cast iron.

10. The brake rotor of claim 1, wherein a bulk material of the disc-shaped friction area is formed of a material other than a cast-iron.

11. A brake rotor, comprising:
a disc-shaped friction area; and
a coating having a metallic alloy composition formed on the friction area to form a friction surface configured to contact a brake pad,
wherein the coating comprises a metallic alloy composition comprising Fe, Cr, B, C, Mn, Si and Mo as alloying elements that are present at concentrations exceeding impurity concentrations such that the metallic alloy composition has a glass-to-crystalline transition temperature of 500° C.-750° C.

12. The brake rotor of claim 11, wherein the metallic alloy composition comprises, on the basis a total weight of the coating:
Fe at a weight percentage exceeding 25%;
Cr at a weight percentage less than 25%;
B at a weight percentage less than 5%;
C at a weight percentage less than 4%;
Mn at a weight percentage less than 3%;
Si at a weight percentage less than 2%; and
Mo at a weight percentage less than 15%.

13. The brake rotor of claim 12, wherein the metallic alloy composition further comprises Nb at a weight percentage greater than an impurity level and less than 12%.

14. The brake rotor of claim 12, wherein the metallic alloy composition further comprises W at a weight percentage greater than an impurity level and less than 15%.

15. The brake rotor of claim 11, wherein the coating comprises one or both of nanocrystalline grains having an average grain size less than 100 nm and a metallic glass.

16. The brake rotor of claim 11, wherein the coating has a porosity of 0.5-5%.

17. The brake rotor of claim 11, wherein the coating has Vickers hardness HV0.30 of 800-1300 kg/mm$^2$.

18. The brake rotor of claim 11, wherein the coating has a bond strength exceeding 11,150 psi based on ASTM C633-2011 standard.

19. A method of coating a brake rotor, the method comprising:
providing a brake rotor having a disc-shaped friction area; and
forming a coating having a metallic alloy composition comprising Fe, Cr, B, C, Mn, Si and Mo as alloying elements on the disc-shaped friction area to form a friction surface configured to contact a brake pad,
wherein forming the coating comprises forming a molten metallic alloy composition and depositing therefrom the coating under a thermally quenching condition such that, as-deposited, the coating comprises a metallic glass exceeding 10% on the basis of a total volume of the coating.

20. The method of claim 19, further comprising annealing the as-deposited coating to devitrify the metallic glass to transform at least some of the metallic glass into nanocrystalline grains.

21. The method of claim 20, wherein after devitrifying, the coating comprises nanocrystalline grains having an average grain size less than 100 nm.

22. The method of claim 20, wherein annealing completely devitrifies the metallic glass such that the final coating consists essentially of the nanocrystalline grains.

23. The method of claim 20, wherein annealing comprises annealing at a temperature of 500° C.-750° C. corresponding to a glass-to-crystalline transition temperature of the metallic alloy composition.

24. The method of claim 19, wherein forming the coating comprises spraying a molten metallic alloy composition.

25. The method of claim 24, wherein the molten metallic alloy composition is formed by arcing a wire having the metallic alloy composition.

26. The method of claim 19, wherein the metallic glass has dissolved therein at least 25% of the alloying elements.

\* \* \* \* \*